United States Patent [19]

Smierciak et al.

[11] Patent Number: 5,618,901

[45] Date of Patent: *Apr. 8, 1997

[54] PROCESS FOR MAKING A HIGH NITRILE MULTIPOLYMER PREPARED FROM ACRYLONITRILE AND OLEFINICALLY UNSATURATED MONOMERS

[75] Inventors: Richard C. Smierciak, Aurora; Eddie Wardlow, Jr., Shaker Hts.; Lawrence E. Ball, Akron, all of Ohio

[73] Assignee: The Standard Oil Company, Cleveland, Ohio

[*] Notice: The term of this patent shall not extend beyond the expiration date of Pat. No. 5,602,222.

[21] Appl. No.: 387,303

[22] Filed: Feb. 27, 1995

Related U.S. Application Data

[63] Continuation-in-part of Ser. No. 150,515, Nov. 10, 1993, abandoned.

[51] Int. Cl.$^6$ .................................................. C08F 220/48
[52] U.S. Cl. ........................................................... 526/342
[58] Field of Search ................................................ 526/342

[56] References Cited

U.S. PATENT DOCUMENTS

| | | |
|---|---|---|
| 2,692,875 | 10/1954 | Weinstock, Jr. et al. . |
| 3,565,876 | 2/1971 | Ball et al. . |
| 4,577,008 | 3/1986 | Benton et al. .................. 526/342 |
| 4,719,150 | 1/1988 | Huber et al. ................... 526/342 |
| 5,106,925 | 4/1992 | Curatolo et al. ............... 526/342 |

FOREIGN PATENT DOCUMENTS

| | | | |
|---|---|---|---|
| 1147040 | 4/1963 | Germany ........................ 526/342 |
| 46-3071 | 1/1971 | Japan ............................. 526/342 |
| 49-67987 | 7/1974 | Japan ............................. 526/342 |
| 1260016 | 10/1989 | Japan ............................. 526/342 |
| 823345 | 11/1959 | United Kingdom ............ 526/342 |

Primary Examiner—Joseph L. Schofer
Assistant Examiner—N. Sarofim
Attorney, Agent, or Firm—David J. Untener; Michael F. Esposito; Teresan W. Gilbert

[57] ABSTRACT

A homogeneous, high nitrile melt processable acrylonitrile olefinically unsaturated multipolymer and a process for making the multipolymer, comprising polymerizing a mixture of acrylonitrile monomer and one or more olefinically unsaturated monomers, in which the rate of addition of the multimonomer mixture is set by the rate of polymerization so that the concentration of unreacted acrylonitrile monomers and unreacted olefinically unsaturated monomer(s) is low and the polymerization process is in a monomer starved condition.

14 Claims, No Drawings

PROCESS FOR MAKING A HIGH NITRILE MULTIPOLYMER PREPARED FROM ACRYLONITRILE AND OLEFINICALLY UNSATURATED MONOMERS

RELATED APPLICATION

This patent application is a continuation-in-part to patent application entitled "A PROCESS FOR MAKING A POLYMER OF ACRYLONITRILE, METHACRYLONITRILE AND OLEFINICALLY UNSATURATED MONOMERS", U.S. Ser. No. 08/150,515 and filed on Nov. 10, 1993 abandoned. It is understood that the term multipolymer herein includes copolymers, terpolymers and multipolymers throughout the specification.

BACKGROUND OF THE INVENTION

1. Field of the Invention

The present invention relates to a homogeneous acrylonitrile olefinically unsaturated multipolymer and a process to make the same. This multipolymer has molecularly uniform monomer sequences throughout the multipolymer, has a high nitrile polymer content and is melt processable. More specifically, the invention relates to a monomer starved process for producing an acrylonitrile olefinically unsaturated multipolymer in which the polymerization rate exceeds or equals the addition rate of the multimonomers of acrylonitrile monomers and olefinically unsaturated monomer(s).

2. Description of the Prior Art

Acrylic polymers are high nitrile polymers which are desirable in the production of fibrous textiles, films, molded objects, packaging applications and the like. High nitrile polymers have excellent physical, thermal and mechanical properties such as barrier properties, chemical resistance, rigidity, heat resistance, UV resistance, moisture retention and bacteria resistance.

However, acrylic polymers and multipolymers having long repeating sequences of acrylonitrile monomer units are known to degrade when heated and processed by commercial methods. The long sequences of nitrile units make the acrylic high nitrile polymers non-processable without the use of solvent.

Thermoplastic nitrile barrier polymer resins are known in the art and have been described in U.S. Pat. Nos. 3,426,102 and 3,586,737. These nitrile polymers are known to have desirable barrier properties and chemical resistance. However, these thermoplastic nitrile polymers while melt processable are difficult to process.

U.S. Pat. No. 5,106,925 discloses a thermoplastic nitrile polymer. However, the process to produce the nitrile polymer is based on tracking the polymer conversion and adding the reactants in the same mount as they are removed and converted to polymer. This process must make proper adjustments in rates and quantities throughout the polymerization process.

It is desirable to produce thermoplastic high nitrile multipolymers by a process in which the nitrile monomer units are uniformly sequenced throughout the chain. It is advantageous to produce a homogeneous acrylonitrile olefinically unsaturated multipolymer with improved thermoplastic properties and a high nitrile content which multipolymers are melt processable in the absence of a solvent. It is an object of the invention to make a nitrile polymer chain with uniformly sequenced and short sequences of the nitrile monomer in a process that has a fixed monomer feed ratio.

SUMMARY OF THE INVENTION

The present invention provides a new melt-processable multipolymer comprising about 50% to about 95% polymerized acrylonitrile and about 5% to about 50% polymerized olefinically unsaturated monomer which is melt-processable and contains relatively uniform distribution of monomers in the multipolymer chain.

The present invention provides a new and an improved process for producing an acrylonitrile olefinically unsaturated multipolymer with improved thermal stability, excellent mechanical and excellent physical properties. The process comprises polymerizing an acrylonitrile monomer and one or more olefinically unsaturated monomers in which the rate of addition of the acrylonitrile monomer and the olefinically unsaturated monomer(s) is set to be equal to or less than the rate of polymerization to maintain a monomer starved process. Further, the weight of unreacted acrylonitrile monomer and unreacted olefinically unsaturated monomer(s) is not greater than 15% of the weight of the polymerizing mixture. Further, the molar ratio of acrylonitrile monomer and olefinicaily unsaturated monomer(s) is fixed and constant for the multimonomer feed throughout the polymerization process and the multipolymer product ratio is similar to the multimonomer feed ratio.

The present invention provides in particular, a process for polymerizing an acrylonitrile monomer and one or more olefinically unsaturated monomers to make an acrylonitrile olefinically unsaturated multipolymer, said process comprising the steps of:

heating an initial multimonomer mixture comprising acrylonitrile monomer and one or more olefinically unsaturated monomer, under an inert atmosphere, in the temperature range of about 30° C. to about 120° C.;

adding an initiator to the initial multimonomer mixture to start a polymerization reaction;

adding a multimonomer feed mixture comprising acrylonitrile monomer and olefinically unsaturated monomer(s) to the polymerization mixture wherein the multimonomer feed mixture contains about 50% by weight to about 95% by weight acrylonitrile monomer and about 5% by weight to about 50% by weight olefinically unsaturated monomer(s), wherein the multimonomer feed mixture has a fixed and constant molar ratio of acrylonitrile monomer to olefinically unsaturated monomer(s), wherein the rate of addition of the multimonomer feed mixture is less than or equal to the rate of polymerization resulting in a homogeneous acrylonitrile olefinically unsaturated multipolymer product; wherein the acrylonitrile olefinically unsaturated multipolymer produced is about 50% by weight to about 95% by weight polymerized acrylonitrile monomer and about 5% by weight to about 50% by weight polymerized olefinically unsaturated monomer(s) and wherein said multipolymer is thermally stable and melt processable without the use of solvents.

The process of the present invention produces a thermoplastic homogeneous acrylonitrile olefinically unsaturated multipolymer in which short sequences of acrylonitrile monomer and short sequences of olefinically unsaturated monomer(s) are interdispersed randomly throughout the polymerized chain resulting in a thermally stable melt processable multipolymer with improved characteristics. The acrylonitrile olefinically unsaturated multipolymer is melt processable in the absence of solvent or plasticizing agent to produce high nitrile products.

DETAILED DESCRIPTION OF THE INVENTION

The present invention relates to a homogeneous, melt processable high nitrile multipolymer prepared from polymerizing an acrylonitrile monomer and one or more olefinically unsaturated monomers and the process to produce the multipolymer.

The new and improved process for producing a thermally stable, melt processable multipolymer from acrylonitrile monomer and olefinically unsaturated monomer(s) is accomplished by controlling the rate of addition of the acrylonitrile monomer and the olefinically unsaturated monomer(s) relative to the rate of polymerization. The process of the invention is a monomer starved process in which the polymerization reaction rate exceeds or equals the multimonomer feed mixture addition rate. The low concentration of the unreacted multimonomers during the polymerization step generates a monomer starved condition which prevents long sequences of acrylonitrile monomer in the multipolymer. The multipolymer contains short sequences of polymerized olefinicaily unsaturated monomer interdispersed between short sequences of polymerized acrylonitrile monomer for example, AN-AN-X-AN-AN-X-X- AN-X -X (AN=acrylonitrile unit and X=olefinically unsaturated unit), allowing for melt processability of the high nitrile thermoplastic acrylonitrile olefinically unsaturated multipolymer in the absence of solvent.

The rate of addition of the acrylonitrile monomer and the olefinically unsaturated monomer(s) is continuous throughout the polymerization reaction. The molar ratio of the multimonomer feed mixture of acrylonitrile monomer and olefinically unsaturated monomer(s) is constant and fixed throughout the process. The process produces a homogeneous composition of a thermoplastic high nitrile multipolymer similar to the molar ratio of the incoming multimonomer feed mixture. The multipolymer material made in the early part of the process is substantially similar to the multipolymer material made at the end of the process, meaning there is no major shift either in composition or sequencing of the multipolymers, resulting in a homogeneous multipolymer product.

The thermoplastic high nitrile multipolymer that is produced by the process of the instant invention comprises about 50% to about 95%, preferably about 65% to about 90% and most preferably about 70% to about 90% of polymerized acrylonitrile monomer, and about 5% to about 50%, preferably about 10% to about 35% and most preferably about 10% to about 30% of polymerized olefinically unsaturated monomer(s).

The olefinically unsaturated monomer employed in the present invention is one or more of any olefinically unsaturated monomer with a C=C double bond polymerizable with an acrylonitrile monomer. The olefinically unsaturated monomer employed in the multimonomer mixture can be a single polymerizable monomer resulting in a copolymer or a combination of polymerizable monomers resulting in a terpolymer or a multipolymer.

The olefinically unsaturated monomer generally includes but is not limited to acrylates, methacrylates, acrylamide and its derivatives, methacrylamide and its derivatives, vinyl esters, vinyl ethers, vinyl aides, vinyl ketones, styrenes, halogen containing monomers, ionic monomers, acid containing monomers, base containing monomers, olefins and the like.

The acrylates include but are not limited to $C_1$ to $C_{12}$ alkyl, aryl and cyclic acrylates such as methyl acrylate, ethyl acrylate, phenyl acrylate, butyl acrylate and isobornyl acrylate, 2-ethylhexyl acrylate and functional derivatives of the acrylates such as 2-hydroxyethyl acrylate, 2-chloroethyl acrylate and the like. The preferred acrylates are methyl acrylate and ethyl acrylate.

The methacrylates include but are not limited to $C_1$ to $C_{12}$ alkyl, aryl and cyclic methacrylates such as methyl methacrylate, ethyl methacrylate, phenyl methacrylate, butyl methacrylate, isobornyl methacrylate, 2-ethylhexyl methacrylate and functional derivatives of the methacrylates such as 2-hydroxyethyl methacrylate, 2-chloroethyl methacrylate and the like. The preferred methacrylate is methyl methacrylate.

The acrylamides and methacrylamides and each of their N-substituted alkyl and aryl derivatives include but are not limited to acrylamide, methacrylamide, N-methyl acrylamide, N,N-dimethyl acrylamide and the like.

The vinyl esters include but are not limited to vinyl acetate, vinyl propionate, vinyl butyrate and the like. The preferred vinyl ester is vinyl acetate.

The vinyl ethers include but are not limited to $C_1$ to $C_8$ vinyl ethers such as ethyl vinyl ether, butyl vinyl ether and the like.

The vinyl amides include but are not limited to vinyl pyrrolidone and the like.

The vinyl ketones include but are not limited to $C_1$ to $C_8$ vinyl ketones such as ethyl vinyl ketone, butyl vinyl ketone and the like.

The styrenes include but are not limited to methylstyrenes, styrene, indene, a styrene of the formula:

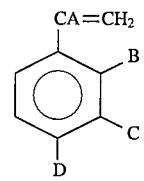

wherein each of A, B, C, and D is independently selected from hydrogen (H) and $C_1$ to $C_4$ alkyl groups, substituted styrenes, multiply-substituted styrenes and the like.

The halogen containing monomers include but are not limited to vinyl chloride, vinyl bromide, vinyl fluoride, vinylidene chloride, vinylidene bromide, vinylidene fluoride, halogen substituted propylene monomers and the like. The preferred halogen containing monomers are vinyl bromide and vinylidene chloride.

The ionic monomers include but are not limited to sodium vinyl sulfonate, sodium styrene sulfonate, sodium methallyl sulfonate, sodium acrylate, sodium methacrylate and the like. The preferred ionic monomers are sodium vinyl sulfonate, sodium styrene sulfonate and sodium methallyl sulfonate.

The acid containing monomers include but are not limited to acrylic acid, methacrylic acid, vinyl sulfonic acid, itaconic acid, styrene sulfonic acid and the like. The preferred acid containing monomers are itaconic acid, styrene sulfonic acid and vinyl sulfonic acid.

The base containing monomers include but are not limited to vinyl pyridine, 2-aminoethyl-N-acrylamide, 3-aminopropyl-N-acrylamide, 2-aminoethyl acrylate, 2-aminoethyl methacrylate and the like.

The olefins include but are not limited to isoprene, butadiene, $C_2$ to $C_8$ straight chained and branched alpha-olefins such as propylene, ethylene, isobutylene, diisobutylene, 1-butene and the like. The preferred olefins are isobutylene, ethylene and propylene.

The olefinically unsaturated monomer does not include nitrile monomers such as methacrylonitrile. The acrylonitrile olefinicaily unsaturated multipolymer does not contain methacrylonitrile.

The choice of olefinically unsaturated monomer or combination of monomers depends on the properties desired to impart to the resulting high nitrile multipolymer and its end use. For instance, polymerizing monomers of acrylonitrile and styrene and/or indene results in a high nitrile multipolymer and its end products with improved heat distortion temperature and glass transition temperature. Polymerizing monomers of acrylonitrile and isobutylene improves the flexibility of the high nitrile multipolymer and its end products. Polymerizing monomers of acrylonitrile and acrylates and/or methacrylates improves the processability of the high nitrile multipolymer and its end products. Polymerizing acid-containing monomers, base containing monomers and/or hydroxyl group containing monomers with an acrylonitrile monomer provides useful dye sites which enhance the colorability of the resulting high nitrile multipolymer. Polymerizing monomers of acrylonitrile and a halogen containing monomer increases the flame resistance of the high nitrile multipolymer and its end products.

In the practice of the present invention the polymerization process is carried out as an emulsion, a solution, a suspension or in continuous addition bulk. Preferably, the polymerization process is carried out as an emulsion or a suspension. The present invention can be practiced as a semibatch or continuous process. The process of the present invention is not carried out as a batch process which batch process is defined herein as a process in which all the reactants are charged initially to the reaction vessel prior to the initiation of polymerization.

Initially, acrylonitrile monomer and olefinically unsaturated monomer(s) are contacted in an aqueous medium at about 0.1% by weight to about 15% by weight of the total polymerization reaction media. The initial multimonomer mixture contains about 50% by weight to about 95% by weight acrylonitrile monomer and about 5% by weight to about 50% by weight olefinically unsaturated monomer(s).

The aqueous medium contains water and a suitable surfactant such as an emulsifier or a dispersing agent. The surfactants and their uses are known to those skilled in the art.

A molecular weight modifier may be added to the initial multimonomer mixture in the range of about 0% by weight to about 5% by weight, preferably about 0.1% by weight to 4% by weight and most preferably about 0.1% by weight to about 3% by weight of the total multimonomer mixture.

The initial multimonomer mixture is placed into a reaction vessel containing aqueous medium. The reaction vessel with the aqueous medium is purged with an inert gas, such as nitrogen, argon and the like. Preferably, but optionally, the inert gas purge is continued throughout the polymerization reaction. The initial multimonomer mixture is then heated to a temperature in the range of about 30° C. to about 120° C., preferably about 40° C. to about 100° C. and most preferably about 50° C. to about 80° C. The temperature of the polymerization reaction is maintained throughout the process in the range of about 30° C. to about 120° C., preferably about 40° C. to about 100° C. and most preferably about 50° C. to about 80° C.

An initiator is added to the heated initial multimonomer mixture to start the polymerization reaction. The initiator is added generally in the range of about 0.01% by weight to about 5% by weight of the total multimonomer mixture.

After the polymerization reaction commences, a multimonomer feed mixture of acrylonitrile monomer and olefinically unsaturated monomer(s) is continuously added to the polymerization reaction in the reaction vessel. The combined weight of the unreacted acrylonitrile monomer and unreacted olefinically unsaturated monomer(s) present in the polymerizing mixture, at any time, is not greater than about 15% by weight, preferably not greater than about 10% by weight, and most preferably not greater than about 5% by weight of the polymerizing mixture.

The multimonomer feed mixture contains about 50% by weight to about 95% by weight acrylonitrile monomer, and 5% by weight to about 50% by weight olefinically unsaturated monomer(s). The molar ratio of the acrylonitrile monomer and the olefinically unsaturated monomer(s) in the multimonomer feed mixture, is fixed and constant throughout the polymerization process resulting in a homogeneous multipolymer. The feed molar ratio of the acrylonitrile monomer to olefinically unsaturated monomer depends on the desired acrylonitrile, olefinically unsaturated multipolymer composition. The multipolymer composition is similar to the composition of the multimonomer feed mixture.

A molecular weight modifier is optionally added to the polymerization mixture. Preferably, a molecular weight modifier is employed in the polymerization mixture. The molecular weight modifier is added continuously or incrementally to the polymerization mixture. Preferably, the molecular weight modifier is added continuously to the polymerization mixture. The molecular weight modifier is preferably added to the polymerization reaction media in the range of about 0% by weight to about 5% by weight, preferably about 0.1% by weight to about 4% by weight, and most preferably about 0.1% by weight to about 3% by weight of the total multimonomer mixture.

The molecular weight modifier includes but is not limited to mercaptans, alcohols, halogen compounds or any other chain transfer agent known to those skilled in the art. Mercaptans are the preferred molecular weight modifier and include mono-mercaptans, multifunctional mercaptans or combinations thereof. The mercaptans include but are not limited to $C_5$ to $C_{18}$ alkyl mercaptans whether straight chained, branched, substituted or unsubstituted, d-limonene dimercaptan, dipentene dimercaptan and the like. The preferred mercaptans are the $C_5$ to $C_{12}$ alkyl mercaptans whether straight chained, branched, substituted or unsubstituted, for example t-dodecyl mercaptan and n-octyl mercaptan. The molecular weight modifier can be employed singularly or in combination. The molecular weight modifier can be the same or a different molecular weight modifier as is employed with the initial multimonomer mixture.

The molecular weight modifier controls the molecular weight of the polymerized acrylonitrile olefinically unsaturated multipolymer chain by terminating the growing chain. The molecular weight modifier useful in the present invention produces an acrylonitrile, olefinically unsaturated multipolymer with a molecular weight in the range of about 15,000 molecular weight to about 500,000 molecular weight.

The initiator is added typically as a single solution, continuously or incrementally, to the polymerization mixture as a separate stream. Preferably, the initiator is added continuously. The initiator is added at a rate to maintain the polymerization rate, which rate can be determined by those skilled in the art. The concentration of the initiator is generally in the range of about 0.01% by weight to about 5% by weight of the total multimonomer mixture.

The initiator is any free radical initiator known to those skilled in the art. The initiator includes but is not limited to azo compounds, peroxides, hydroperoxides, alkyl peroxides, peroxydicarbonates, peroxyesters, dialkyl peroxides, persulfates, perphosphates, and the like. Persulfates are the preferred initiators. The initiator can be employed singularly or in combination. The initiator can be the same or a different initiator as is employed to start the polymerization reaction.

The polymerization mixture is continuously or intermittently agitated by any known method, such as stirring, shaking and the like. Preferably, the polymerization mixture is continuously agitated.

The reaction is continued until polymerization has proceeded to the desired extent, generally from about 40% to about 99% conversion and preferably from about 70% to about 95% conversion.

The polymerization reaction is stopped by cooling; adding an inhibitor; such as diethyl hydroxylamine, 4-methoxyphenol and the like; discontinuing the multimonomer feed mixture; and the like. The inhibitors and their use are known to those skilled in the art.

It will be readily apparent to one skilled in the art that the acrylonitrile olefinically unsaturated multipolymer may be further modified by the addition of lubricants, dyes, leaching agents, plasticizers, pseudoplasticizers, pigments, delustering agents, stabilizers, static control agents, antioxidants, reinforcing agents such as fillers and the like. It is understood that any additive possessing the ability to function in such a manner can be used as long as it does not have a deleterious effect on the melt characteristics and thermal stability of the high nitrile multipolymer.

At the conclusion of the polymerization reaction the acrylonitrile olefinically unsaturated multipolymer is isolated as a solid, slurry or a latex. Any known technique may be used to isolate the acrylonitrile olefinically unsaturated multipolymer such as crumb coagulation, spraying the solution of the multipolymer into a heated and/or evacuated chamber to remove the water vapors, stripping, filtration, centrifugation and the like.

The acrylonitrile olefinically unsaturated multipolymer produced by the process of the instant invention is a high nitrile thermoplastic multipolymer containing polymerized acrylonitrile monomer and olefinically unsaturated monomer(s). The multipolymer comprises about 50% by weight to about 95% by weight polymerized acrylonitrile and about 5% by weight to about 50% by weight polymerized olefinically unsaturated monomer(s). The multipolymer product is homogeneous in that the composition and sequencing of the multipolymer produced is substantially the same throughout the process.

The acrylonitrile olefinically unsaturated multipolymer is thermally stable, melt processable without the addition of any solvents and homogeneous. The multipolymer of the present invention may be further processed by spinning, molding, extruding and the like without the use of solvents. The acrylonitrile olefinically unsaturated multipolymer possesses excellent thermal, physical and mechanical properties, can be readily oriented and is homogenous with short sequences of polymerized nitrile monomer units. Further, the acrylonitrile olefinically unsaturated multipolymer may be utilized in numerous applications such as for use as fibers, sheets, films, pipes, tubings, molded articles and the like.

SPECIFIC EMBODIMENT

The following examples demonstrate the process and advantages of the present invention.

Equipment

A 1 or 2 liter circulating hot water jacketed reactor was equipped with a reflux condenser, a thermocouple/controller, a paddle for agitation, which paddle was set at about 230 rpm to about 250 rpm, an argon purge tube (continuous), a monomer feed mixture pump and an ammonium persulfate initiator feed pump.

Components

The overall polymerization components for the examples were as follows:

| Component | Grams (gm) |
|---|---|
| Example 1 | |
| Water | 1260.0 |
| Rhofac RE-610 | 12.6 |
| Acrylonitrile (AN) | 342.3 |
| α-Methyl styrene (MS) | 77.7 |
| n-Octyl Mercaptan | 8.4 |

| Component | Grams (gm) |
|---|---|
| Ammonium Persulfate | 1.3 |
| Total: | 1702.3 |
| Example 2 | |
| Water | 1320.0 |
| Rhofac RE-610 | 17.6 |
| Acrylonitrile (AN) | 378.4 |
| Methyl Acrylate (MA) | 30.8 |
| Methyl Methacrylate (MMA) | 30.8 |
| n-Octyl Mercaptan | 8.8 |
| Ammonium Persulfate | 2.8 |
| Total: | 1789.2 |
| Example 3 | |
| Water | 1320.0 |
| Rhofac RE-610 | 17.6 |
| Acrylonitrile (AN) | 338.8 |
| Methyl Methacrylate (MMA) | 101.2 |
| n-Octyl Mercaptan | 8.8 |
| Ammonium Persulfate | 2.8 |
| Total: | 1789.2 |
| Example 4 | |
| Water | 1200.0 |
| Dowfax 8390 (35% active) | 45.7 |
| Acrylonitrile (AN) | 340.0 |
| Methyl Acrylate (MA) | 60.0 |
| n-Dodecyl Mercaptan | 11.2 |
| Ammonium Persulfate | 0.8 |
| Total: | 1657.7 |
| Example 5 | |
| Water | 1200.0 |
| Rhofax RE-610 | 12.0 |
| Acrylonitrile (AN) | 344.0 |
| Styrene (ST) | 56.0 |
| n-Octyl Mercaptan | 9.0 |
| Ammonium Persulfate | 2.5 |
| Total: | 1623.5 |
| Example 6 | |
| Water | 750.0 |
| Dowfax 8390 (35% active) | 7.5 |
| Acrylonitrile (AN) | 212.5 |
| Vinyl Acetate (VA) | 37.5 |
| n-Dodecyl Mercaptan | 7.0 |
| Ammonium Persulfate | 1.6 |
| Total: | 1016.1 |
| Example 7 | |
| Water | 1200.0 |
| Rhofax RE-610 | 12.0 |
| Acrylonitrile | 340.0 |
| Methyl Methacrylate (MMA) | 30.0 |
| Vinyl Acetate (VA) | 30.0 |
| n-Octyl Mercaptan | 8.0 |
| Ammonium Persulfate | 2.5 |
| Total | 1622.5 |

The Rhofac RE-610 is available from Rhone-Poulenc. Dowfax is available from Dow Chemical Co.

Procedure:

The reactor was pre-charged with water and the surfactant which had been pre-dissolved at about 50° C. with stirring at about 230–250 rpm (see Table I). The reactor was heated to about 70° C. with continuous argon purging. The initial monomer charge (see Table II) was added to the reactor. Ammonium persulfate initiator was added to the reactor to initiate the polymerization reaction.

The multimonomer feed mixture (see Table III) containing mercaptan was continuously pumped into the reactor at a constant, fixed weight ratio of acrylonitrile monomer ("AN") to the olefinically unsaturated monomer ("X") (see Table VI). Simultaneously, the ammonium persulfate initiator was pumped into the reactor (See Table IV). Both the multimonomer feed mixture stream and the initiator stream were fed into the reactor as separate streams. Total polymerization reaction time was about 4 to about 6 hours.

After the polymerization reaction was completed the resulting multipolymer emulsion was filtered through a piece of pre-weighed cheesecloth to collect and separate any coagulum from multipolymer. The coagulum was bundled in a cheesecloth and rinsed with warm tap water. The cheesecloth was dried overnight at about 60° C. Then the dried cheesecloth/coagulum was weighed. The coagulum was about nil to about 3% by weight multimonomers. The latexes were then coagulated in about 1% aluminum sulfate aqueous solution at about 75° C. to 85° C. with continuous stirring. The washed and filtered multipolymer crumb was dried for about 3 to about 24 hours on a vacuum filtered funnel. The multipolymer was then dried in a fluidized bed dryer at about 55° C. for about 3 hours. The acrylonitrile, olefinically unsaturated multipolymer was then analyzed (See Table V and VI).

TABLE I

| | Aqueous Precharge | | |
|---|---|---|---|
| Example | Water | Rhofac RE-blu (gm) | Dowfax 8390 |
| 1 | 1160 | 12.6 | 0 |
| 2 | 1220 | 17.6 | 0 |
| 3 | 1220 | 17.6 | 0 |
| 4 | 1100 | 0 | 45.7 |
| 5 | 1100 | 12.0 | 0 |
| 6 | 677.5 | 0 | 20.0 |
| 7 | 1100 | 12.0 | 0 |

TABLE II

| | | INITIAL MONOMER CHARGE (gm) | | | |
|---|---|---|---|---|---|
| Example | Mercaptan | Acrylonitrile Monomer | Olefinically Unsaturated Monomer X-1 | Olefinically Unsaturated Monomer X-2 | Initiator Ammonium persuffate (gm) |
| 1 | 2.1 gm n-octyl mercaptan | 21.0 | 21.0 MS | 0 | 0.71 |
| 2 | 2.2 gm nwyl mercaptan | 37.8 | 3.1 MMA | 3.1 MMA | 1.45 |
| 3 | 2.2 gm n-octyl mercaptan | 41.8 | 2.2 MMA | 0 | 1.45 |
| 4 | 2.8 gm n-dodecyl mercaptan | 34.0 | 6.0 MA | 0 | 0.42 |
| 5 | 2.24 gm n-octyl mercaptan | 38.0 | 2 ST | 0 | 1.32 |
| 6 | 1.8 gm n-dodecyl mercaptan | 13.8 | 11.3 VA | 0 | 0.53 |
| 7 | 2.0 gm n-octyl mercaptan | 34.0 | 3.0 MA | 3.0 MA | 1.33 |

TABLE III

| | MULTIMONOMER FEED MIXTURE | | | | |
|---|---|---|---|---|---|
| Example | Mercaptan* (gm) | AN Monomer (gm) | $X_1$ Monomer (gm) | $X_2$ Monomer (gm) | Total Polymermization (hrs.) |
| 1 | 6.3 | 321.3 | 56.7 MS | 0 | 6 |
| 2 | 6.6 | 336.6 | 29.7 MMA | 29.7 MA | 6 |
| 3 | 6.6 | 297 | 99.0 MMA | 0 | 6 |
| 4 | 8.4 | 306 | 54 MA | 0 | 4 |
| 5 | 6.76 | 306 | 54 ST | 0 | 6 |
| 6 | 5.3 | 199 | 26.2 VA | 0 | 5 |
| 7 | 6.0 | 306 | 27.0 VA | 27.0 MA | 6 |

*n-octyl mercaptan was employed in examples 1, 2, 3, 5, and 7.
n-dodeceyl mercaptan was employed in examples 4 and 6.

TABLE IV

| Aqueous Initiator Feed Mixture | | |
|---|---|---|
| Example | Ammonium Persulfate (gms) | Water (gms0) |
| 1 | 0.63 | 100 |
| 2 | 1.31 | 100 |
| 3 | 1.31 | 100 |
| 4 | 0.38 | 100 |
| 5 | 1.2 | 100 |
| 6 | 1.1 | 61 |
| 7 | 1.31 | 100 |

TESTING:

Molecular Weight:

The molecular weight (MW) of a multipolymer was determined by Gel Permeation Chromatography (GPC) in dimethyl formamide solvent and calibrated with polystyrene standards. This is a known standard method. The results are presented in Table V.

Glass Transition Temperature:

The glass transition temperature (Tg) was obtained by differential scanning calorimetry (DSC), A DuPont 1090 instrument was used over a temperature range from room temperature to 240° C. at a heating rate of about 5° C./minute under an atmosphere of nitrogen The results are presented in Table V.

NMR Analysis:

Samples for NMR Analysis were prepared using DMSO-D6 as solvent. Compositions were determined using $^1$H spectra and sequence distributions were determined using $^{13}$C spectra. $^1$H spectra were obtained using a Varian Gemini 300 Spectrometer at 300 MHz and/or a Varian VXR-400 Spectrometer at 400 MHz. $^{13}$C spectra were obtained using a Varian Gemini 300 Spectrometer at 75.5 MHz and/or a Varian VXR-400 Spectrometer at 100.7 MHz. The numerical data is presented in Table VI.

Brabender Plasticorder:

The Brabender plasticorder, available from C. W. Brabender Instruments Inc., South Hackensack, N.J., is a low shear melt mixing device that measures the torque (metergrams, m-g) required to melt stir a molten polymer. The test determines whether a polymer may be melted and processed employing standard thermoplastic equipment. The Brabender analyses were run at about 200° C. with torque readings taken at about 5 minute intervals to about 30 minutes. This method measures polymer degradation as a function of time, temperature, and physical abrading. The numerical data is presented in Table V.

TABLE VI

| Polymer Chemical Properties by $^{13}$C NMR | | | |
|---|---|---|---|
| | Composition | | |
| Example | Monomer Composition | Monomer Charge Ratio (%) | Polymer Analysis (%) |
| 1 | AN/MS | 81/19 | 76.4/23.6 |
| 2 | AN/MMA/MA | 85/7.5/7.5 | 83.2/11.2/5.6 |
| 3 | AN/MMA | 75/25 | 68.5/31.5 |
| 4 | AN/MA | 85/15 | 85.7/14.3 |
| 5 | AN/ST | 85/15 | 84.8/15.2 |
| 6 | AN/VA | 85/15 | 84.6/15.4 |
| 7 | AN/MA/VA | 85/7.5/7.5 | 87.4/7.7/4.9 |

| Monomer Sequence | | | | | | | |
|---|---|---|---|---|---|---|---|
| Example | | | | | | | |
| | XXX | XXA | AXA | XAX | AAX | AAA | |
| 1 | 12.9 | 43.4 | 43.7 | 8.2 | 48.3 | 43.5 | |
| 2 | BBA | ABA | CCA | ACA | XAX | AAX | AAA |
| | 18.7 | 81.3 | 7.9 | 92.1 | 2.7 | 14.8 | 82.5 |
| | XXX | XXA | AXA | XAX | AAX | AAA | |
| 3 | 0 | 20.8 | 79.2 | 0 | 31.3 | 68.7 | |
| 4 | 7.5 | 24.6 | 67.9 | 4.0 | 19.6 | 76.5 | |
| 5 | 16.0 | 59.9 | 24.0 | 1.5 | 13.1 | 85.5 | |
| 6 | * | * | * | 3.1 | 20.2 | 76.7 | |
| 7 | * | * | * | 2.9 | 18.3 | 78.8 | |

A = acrylonitrile
B = methyl methacrylate
C = Methyl acrylate
X = olefinically unsaturated monomer
*Not measurable by $^{13}$C NMR Results:

A very uniform and homogeneous acrylonitrile olefinically unsaturated multipolymer was produced by the process described herein. The final conversion to multipolymer was about 90% based on total multimonomers.

The weight average molecular weight of the multipolymer examples were in the range of about 43,000 to about 62,000.

The Brabender torque data for the examples in the range of about 420 m-gm to about 1026 m-gm at ten minutes and about 429 m-gm to about 1329 m-gm at thirty minutes. This demonstrates that the multipolymer is easily melt processed and is thermally stable. The Brabender torque data is shown in Tables V.

NMR data demonstrated that the sequencing of the multipolymer was interdispersed and had a high degree of randomness as shown in Table VI. Further, the polymer analysis demonstrates that the multipolymer product ratio is similar to the multimonomer feed ratio.

TABLE V

| Polymer Physical Properties | | | | | |
|---|---|---|---|---|---|
| Example | Tg (°C.) | Molecular Weight $M_w$ | Brabender Torque m-gm, 200° C. 10 minutes | Brabender Torque m-gm, 200° C. 20 minutes | Brabender Torque m-gm, 200° C. 30 minutes |
| 1 | 103 | 50,000 | 420 | 420 | 429 |
| 2 | 81 | 46,000 | 653 | 641 | 641 |
| 3 | 83 | 43,000 | 298 | 286 | 298 |
| 4 | 77 | 62,000 | 939 | 996 | 1115 |
| 5 | 93 | 43,000 | 529(220° C.) | 550(220° C.) | 732(220° C.) |
| 6 | 90 | 59,000 | 900 | 1329 | 1836 |
| 7 | 86 | 48,000 | 1026 | 957 | 992 |

From the above description and examples of the invention those skilled in the art will perceive improvement, changes and modification in the invention. Such improvements, changes and modifications within the skill of the art are intended to be covered by the appended claims.

What is claimed:

1. A process for polymerizing an acrylonitrile monomer and one or more olefinically unsaturated monomers to make an acrylonitrile olefinically unsaturated multipolymer, said process comprising the steps of:

heating an initial multimonomer mixture comprising acrylonitrile monomer and one or more olefinically unsaturated monomer, under an inert atmosphere, in the range of about 30° C. to about 120° C.;

adding an initiator to the initial multimonomer mixture to start a polymerization reaction;

adding a multimonomer feed mixture comprising acrylonitrile monomer and olefinically unsaturated monomer(s) to the polymerization mixture wherein the multimonomer feed mixture contains about 50% by weight to about 95% by weight acrylonitrile monomer and about 5% by weight to about 50% by weight olefinically unsaturated monomer(s), wherein the multimonomer feed mixture has a fixed and constant molar ratio of acrylonitrile monomer to olefinically unsaturated monomer(s); and wherein the rate of addition of the multimonomer feed mixture is less than or equal to the rate of polymerization.

2. The process of claim 1 wherein a molecular weight modifier is added to the initial multimonomer mixture, to the multimonomer feed mixture or to both mixtures in the range of about 0% by weight to about 5% by weight of total multimonomer mixture and is selected from the group consisting of mercaptans, alcohols, halogen compounds and combinations thereof.

3. The process of claim 2 wherein the molecular weight modifier is a mono-mercaptan, a multifunctional mercaptan or combinations thereof and further wherein the mercaptan is selected from the group consisting of $C_5$ to $C_{18}$ alkyl mercaptans which are straight chained, branched, substituted, unsubstituted and combinations thereof.

4. The process of claim 3 wherein the mercaptan is selected from the group consisting of t-dodecyl mercaptan, n-octyl mercaptan, d-limonene dimercaptan and combinations thereof.

5. The process of claim 1 wherein the initial multimonomer mixture is heated from about 50° C. to about 80° C.

6. The process of claim 1 wherein the initiator is added to the initial multimonomer mixture in the range of 0.01% by weight to about 5% by weight of total multimonomer mixture and is selected from the group consisting of azo compounds, peroxides, hydroperoxides, alkyl peroxides, peroxydicarbonates, peroxyesters, dialkyl peroxides, persulfates, perphosphates and combinations thereof.

7. The process of claim 1 further comprising the step of adding an initiator continuously to the polymerization reaction media and wherein the initiator is added to the polymerization reaction media at about 0.01% by weight to about 5% by weight of total multimonomer mixture and is further selected from the group consisting of azo compounds, peroxides, hydroperoxides, alkyl peroxides, peroxydicarbonates, peroxyesters, dialkyl peroxides, persulfates, perphosphates and combinations thereof.

8. The process of claim 1 wherein the combined weight of unreacted acrylonitrile monomer and unreacted olefinically unsaturated monomer present in the polymerizing mixture, at any time, is not greater than about 15% by weight of the polymerizing mixture.

9. The process of claim 1 wherein the combined weight of unreacted acrylonitrile monomer and unreacted olefinically unsaturated monomer present in the polymerizing mixture, at any time, is not greater than about 10% by weight of the polymerizing mixture.

10. The process of claim 1 wherein the combined weight of unreacted acrylonitrile monomer and unreacted olefinically unsaturated monomer present in the polymerizing mixture, at any time, is not greater than about 5% by weight of the polymerizing mixture.

11. The process of claim 1 wherein said process is carried out as an emulsion, a solution, a suspension or in continuous addition bulk.

12. The process of claim 1 wherein the olefinically unsaturated monomer is selected from the group consisting of acrylates, methacrylates, acrylamides, methacrylamides, acrylamide derivatives, methacrylamide derivatives, vinyl esters, vinyl ethers, vinylamides, vinyl ketones, styrenes, halogen containing monomers, ionic monomers, acid containing monomers, base containing monomers, olefins and combinations thereof.

13. The process of claim 12 wherein the olefinically unsaturated monomer is selected from the group consisting of methyl acrylate, ethyl acrylate, methyl methacrylate, vinyl acetate, styrene, α-methyl styrene, indene, vinyl bromide, vinylidene chloride, sodium vinyl sulfonate, sodium styrene sulfonate, sodium methallyl sulfonate, itaconic acid, styrene sulfonic acid, vinyl sulfonic acid, isobutylene, ethylene, propylene and combinations thereof.

14. The process of claim 12 wherein the olefinically unsaturated monomer is selected from the group consisting of α-methyl styrene, methyl acrylate, methyl methacrylate, styrene, vinyl acetate and combinations thereof.

* * * * *